US012018397B2

(12) United States Patent
Swonger

(10) Patent No.: US 12,018,397 B2
(45) Date of Patent: Jun. 25, 2024

(54) SYSTEM AND PROCESS FOR PRODUCING LITHIUM

(71) Applicant: ALPHA-EN CORPORATION, Yonkers, NY (US)

(72) Inventor: Lawrence Ralph Swonger, Lititz, PA (US)

(73) Assignee: ALPHA-EN CORPORATION, Yonkers, NY (US)

( * ) Notice: Subject to any disclaimer, the term of this patent is extended or adjusted under 35 U.S.C. 154(b) by 57 days.

(21) Appl. No.: 17/386,867

(22) Filed: Jul. 28, 2021

(65) Prior Publication Data

US 2022/0010447 A1 Jan. 13, 2022

Related U.S. Application Data

(63) Continuation of application No. 16/253,460, filed on Jan. 22, 2019, now abandoned.
(Continued)

(51) Int. Cl.
*C25D 3/42* (2006.01)
*C03C 3/21* (2006.01)
*C03C 4/18* (2006.01)
*C03C 10/00* (2006.01)
*C25C 1/02* (2006.01)
*C25D 7/06* (2006.01)
(Continued)

(52) U.S. Cl.
CPC ............... *C25D 3/42* (2013.01); *C03C 3/21* (2013.01); *C03C 4/18* (2013.01); *C03C 10/00* (2013.01); *C25C 1/02* (2013.01); *C25D 7/0642* (2013.01); *C25D 17/002* (2013.01); *C25D 17/005* (2013.01); *C25D 17/02* (2013.01); *C25D 17/10* (2013.01); *C25D 17/12* (2013.01); *C25D 21/02* (2013.01); *C25D 21/18* (2013.01)

(58) Field of Classification Search
None
See application file for complete search history.

(56) References Cited

U.S. PATENT DOCUMENTS

2004/0182694 A1   9/2004  Nevosi et al.
2005/0100793 A1   5/2005  Jonghe et al.
(Continued)

FOREIGN PATENT DOCUMENTS

WO    WO 2017/095989    6/2017

OTHER PUBLICATIONS

International Search Report and Written Opinion issued in related international patent application No. PCT/US2019/014517 dated Apr. 18, 2019.

*Primary Examiner* — Wojciech Haske
(74) *Attorney, Agent, or Firm* — Haynes and Boone, LLP

(57) ABSTRACT

A decoupled plating system is provided for producing lithium. In a general embodiment, the present disclosure provides a feed tank configured to supply a lithium-rich aqueous electrolyte stream, a plating tank that is configured to receive an organic electrolyte and plate out lithium metal from that organic electrolyte, and one or more lithium replenishment cells configured to receive both electrolytes, keep them separated, and selectively move lithium ions from the aqueous electrolyte into the spent organic electrolyte stream. The present system and process can advantageously reduce operating costs and/or improve energy efficiency in production of lithium metal and associated products.

24 Claims, 3 Drawing Sheets

Related U.S. Application Data

(60) Provisional application No. 62/620,119, filed on Jan. 22, 2018.

(51) Int. Cl.
*C25D 17/00* (2006.01)
*C25D 17/02* (2006.01)
*C25D 17/10* (2006.01)
*C25D 17/12* (2006.01)
*C25D 21/02* (2006.01)
*C25D 21/18* (2006.01)

(56) References Cited

U.S. PATENT DOCUMENTS

2013/0199936 A1* 8/2013 Zhang .................. C25D 3/48
  205/264
2014/0158545 A1* 6/2014 Schafer ................ C25D 17/12
  204/251
2016/0351889 A1* 12/2016 Swonger ............... A61N 1/378
2017/0294661 A1  10/2017 Melman et al.

* cited by examiner

SYSTEM AND PROCESS FOR PRODUCING LITHIUM

PRIORITY CLAIM

This application claims priority to U.S. Provisional Patent Application No. 62/620,119, entitled "System And Process For Producing Lithium", filed Jan. 22, 2018, the entire contents of which are hereby incorporated by reference and relied upon.

FIELD OF TECHNOLOGY

The present disclosure generally relates to systems and processes for producing lithium. More specifically, for example, the present disclosure relates to a decoupled plating system comprising a feed tank to supply lithium-rich aqueous electrolyte, a plating tank configured to receive an organic electrolyte, and one or more lithium replenishment cells configured to regenerate lithium into a spent organic electrolyte stream from the aqueous electrolyte stream. Additionally the present disclosure also relates to processes for plating lithium onto a substrate from the organic electrolyte and regenerating the spent electrolyte stream.

BACKGROUND

Lithium is a soft, silver-white metal belonging to the alkali metal group of chemical elements. Lithium is highly reactive and flammable, though it is the least reactive of the alkali metals. Because of its high reactivity, lithium does not occur freely in nature. Instead, lithium only appears naturally in compositions, usually ionic in nature. Therefore, lithium metal can be obtained only by extraction of lithium from such compounds containing lithium.

SUMMARY

Currently, lithium can be obtained using a single cell, in which an aqueous feed electrolyte flows through one side of the cell, and a stagnant or flowing organic electrolyte fills a cavity on the other side of the cell. The sample to be plated with lithium is submersed in the organic electrolyte above the lithium ion conductive glass-ceramic (LiC-GC) separator plate. When potential is applied to the cell, lithium ions migrate from the aqueous electrolyte, through the LiC-GC separator plate into the organic electrolyte, and the lithium is plated onto the substrate from the organic electrolyte. The current cell uses a single set of electrodes to provide a potential across the LiC-GC separator and plate lithium onto the anode. In a "decoupled" lithium producing system according to an embodiment of the present disclosure, two sets of electrodes are used to allow the potential driving the lithium replenishment rate through the LiC-GC separator to be independent from the potential driving plating onto the substrate.

In the current cell, the size of the substrate to be plated has typically been limited by the size of the organic electrolyte reservoir on the plating side of the cell. The size of this reservoir has been kept at a minimum to minimize the amount of organic electrolyte used, but also to try and keep the deposited lithium film as uniform as possible. A large volume of uncirculating organic electrolyte would tend to have gradients in lithium ion concentration when plating. Accordingly, the organic electrolyte cavity was sized to match the LiC-GC plate size, again to minimize gradients during deposition. There is a need for a system that can make the size of the plated sample larger than and independent from the current size of the separator membrane.

In one non-limiting aspect, the present disclosure relates to a decoupled plating system for producing lithium. The system includes a plating tank configured to receive an organic electrolyte, an anode provided within the plating tank, a substrate spaced apart from the anode and provided within the plating tank, and one or more lithium replenishment cells. The anode and the substrate are configured to apply a potential to the substrate, whereupon lithium is plated onto the substrate from the organic electrolyte, and a spent electrolyte stream is discharged. The one or more lithium replenishment cells are configured to receive the spent electrolyte stream and to form one or more regenerate electrolyte streams.

The present disclosure also provides a process for producing lithium. The process comprises forwarding an organic electrolyte to a plating tank. An anode and a substrate are provided within the plating tank. A potential is applied to the substrate, thereby plating lithium onto the substrate from the organic electrolyte and forming a spent electrolyte stream. The spent electrolyte stream is regenerated within one or more lithium replenishment cells.

The present disclosure also provides a lithium producing system comprising a plating tank configured to receive an organic electrolyte, an anode provided within the plating tank, a substrate spaced apart from the anode and provided within the plating tank, and one or more lithium replenishment cells configured to receive the organic electrolyte stream from the plating tank. The one or more lithium replenishment cells comprise a lithium ion conductive glass ceramic, and the substrate is larger than the lithium ion conductive glass ceramic.

In an embodiment, the anode comprises a substantially planar mesh structure.

In an embodiment, the substrate comprises a substantially planar body portion.

In an embodiment, the plating tank includes one or more sidewalls, and the anode and the substrate are coupled to the one or more sidewalls, although at least one of the anode and substrate could be hung in the tank away from the walls as long as there is a space between the anode and the substrate.

In an embodiment, the substrate measures approximately 12.7 cm or greater in the longest dimension. In another embodiment, the size of the substrate is limited only by the plating tank size.

In an embodiment, the organic electrolyte comprises a DMC-LiPF6 mix.

In an embodiment, the organic electrolyte is any electrolyte compatible with lithium metal, such as standard electrolytes used in lithium ion and lithium metal batteries.

In an embodiment, the aqueous electrolyte is lithium carbonate dissolved in sulfuric acid to create a lithium sulfate solution.

In an embodiment, the aqueous electrolyte is any lithium ion rich electrolyte solution, such as lithium chloride brine, acid solution used to leech lithium from recycled lithium battery materials, or lithium hydroxide solution.

In an embodiment, the one or more lithium replenishment cells are configured to receive an aqueous electrolyte on one side of the cell, and the one or more lithium replenishment cells comprise a lithium ion conductive glass ceramic that separates the aqueous electrolyte from the organic electrolyte circulating through the other side of the cell.

In an embodiment, the lithium ion conductive glass ceramic is an ion conductive glass-ceramic having the following composition in mol percent: $P_2O_5$ 26-55%; $SiO_2$ 0-15%; $GeO_2+TiO_2$ 25-50%; in which $GeO_2$ 0-50%; $TiO_2$ 0-50%; $ZrO_2$ 0-10%; $M_2O_3$ 0-10%; $Al_2O_3$ 0-15%; $Ga_2O_3$ 0-15%; $Li_2O_3$-25% and containing a predominant crystalline phase comprising $Li_{1+x}(M, Al, Ga)_x(Ge_{1-y}Ti_y)_{2-x}(PO_4)_3$ where $X\leq0.8$ and $0\leq Y\leq1$ and where M is an element selected from the group consisting of Nd, Sm, Eu, Gd, Tb, Dy, Ho, Er, Tm and Yb, and/or $Li_{1+x+y}Q_xTi_{2-x}Si_3P_{3-y}O_{12}$ where $0<X\leq0.4$ and $0<Y\leq0.6$, and where Q is Al or Ga.

In an embodiment, the lithium ion conductive glass ceramic measures approximately 7.6 cm or less in the longest dimension.

In an embodiment, the lithium producing system comprises a plurality of the lithium replenishment cells.

In an embodiment, the organic electrolyte is continuously provided to the plating tank, and the spent electrolyte is continuously regenerated at the one or more lithium replenishment cells and returned to the plating tank.

An advantage of the present disclosure is to simplify the lithium extraction process scale up, improve the production system reliability, make the size of the plated sample independent from the size of the separator membrane, and make the potential driving lithium replenishment into the organic electrolyte independent (decoupled) from the potential driving plating at the substrate. It is a further advantage of the present disclosure to reduce operating costs and/or improve energy efficiency in production of lithium.

Additional features and advantages are described herein, and will be apparent from the following Detailed Description and the figures.

DETAILED DESCRIPTION

The terminology used herein is for the purpose of describing particular embodiments only and is not intended to be limiting. As used in the specification and the appended claims, the singular forms "a," "and" and "the" include plural references unless the context clearly dictates otherwise.

For the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

The present disclosure generally relates to a decoupled plating system comprising a plating tank configured to receive an organic electrolyte, and one or more lithium replenishment cells configured to regenerate a spent electrolyte stream. Additionally the present disclosure also relates to processes for plating lithium onto a substrate from the organic electrolyte and regenerating the spent electrolyte stream.

Figure 1:
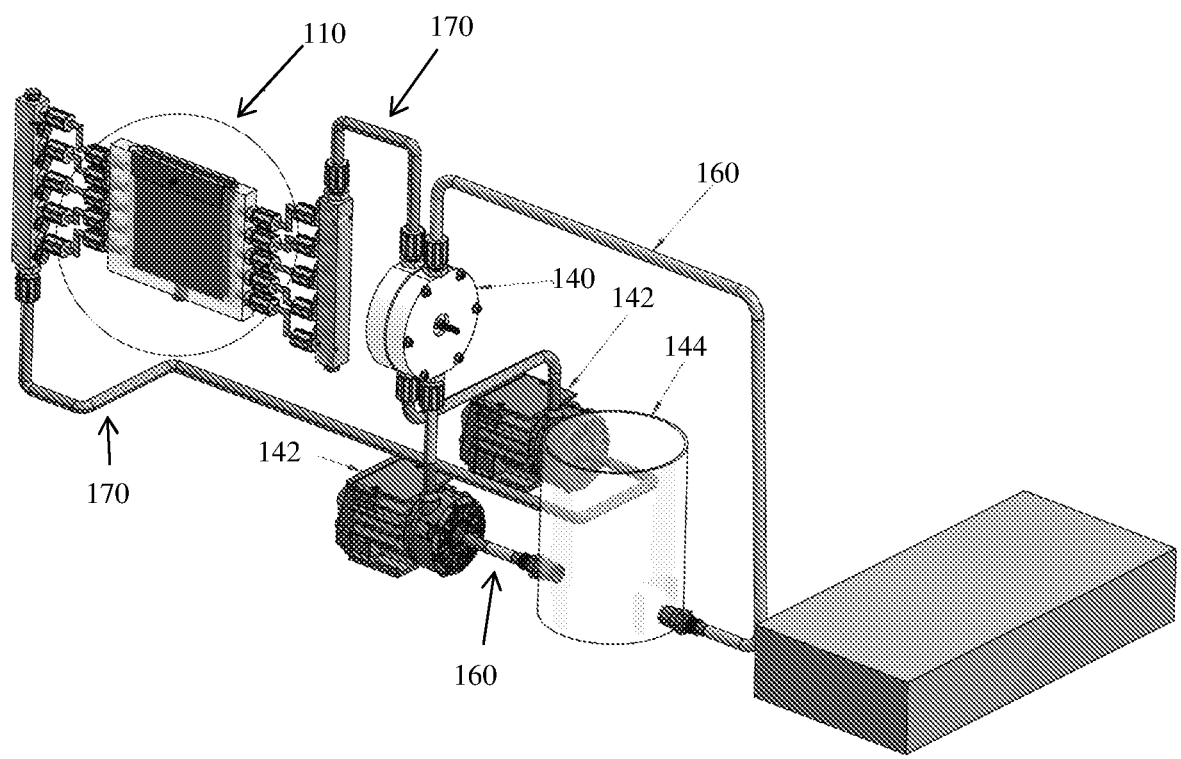
FIG. 1 is a perspective view of a lithium producing system according to an embodiment of the present disclosure.
Figure 2:
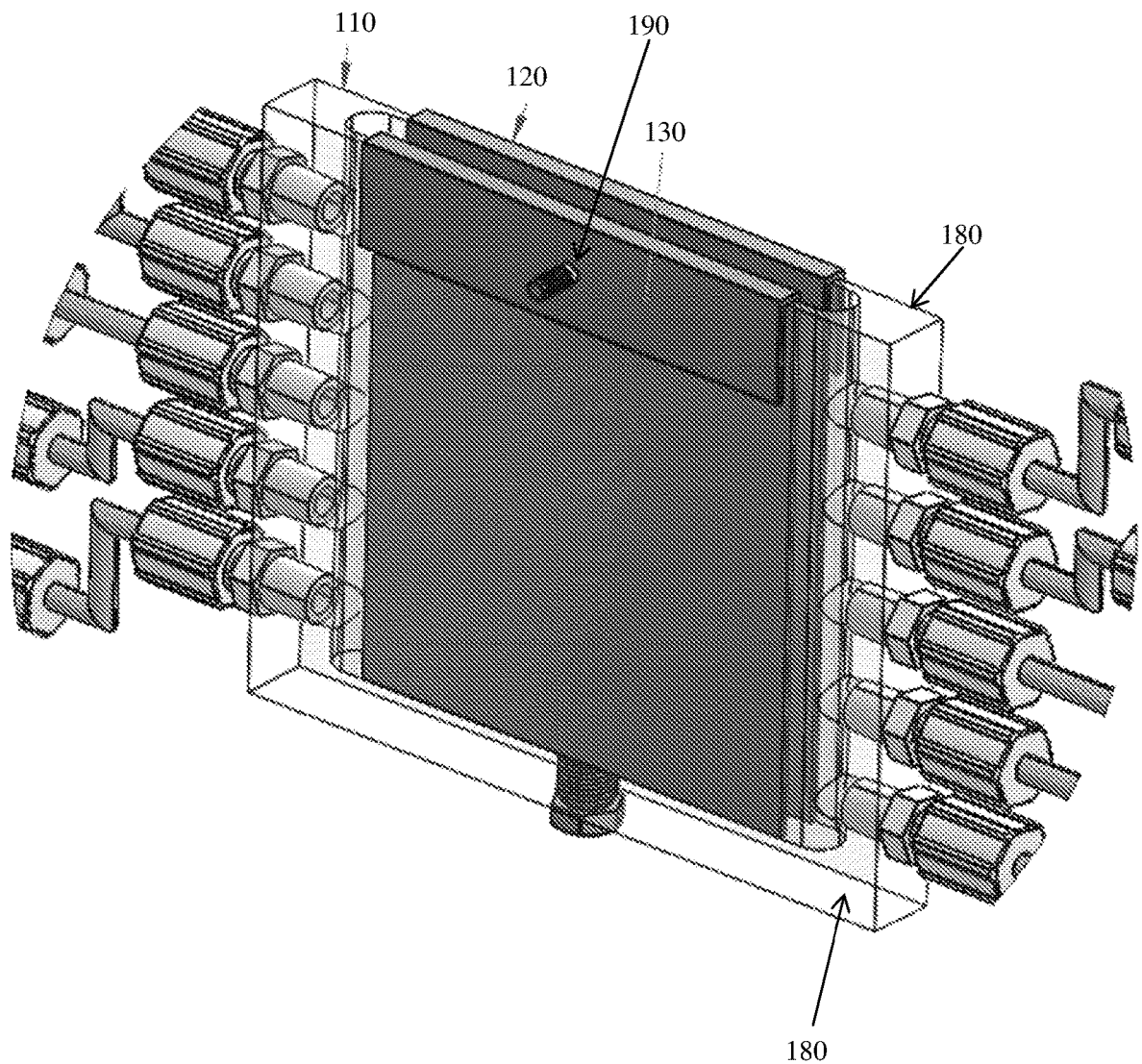
FIG. 2 is an enlarged partial view of the plating tank used in the lithium producing system of FIG. 1.

Referring initially to FIGS. 1 and 2, the illustrated embodiment of the system 100 for producing lithium includes a plating tank 110 configured to receive an organic electrolyte, an anode 120 provided within the plating tank 110, a substrate or plating cathode 130 spaced apart from the anode 120 and provided within the plating tank 110, and one or more lithium replenishment cells 140. In a non-limiting embodiment, the organic electrolyte comprises a DMC-LiPF6 mix or an equivalent electrolyte compatible with lithium ions, including standard electrolytes used in lithium ion and lithium metal batteries. The lithium producing systems and processes described herein are not limited in this regard. The anode 120 and the substrate 130 are configured to apply a potential to the substrate 130, whereupon lithium is plated onto the substrate 130 from the organic electrolyte, and a spent electrolyte stream is discharged. The one or more lithium replenishment cells 140 are configured to receive the spent electrolyte stream and to form one or more regenerate electrolyte streams.

Figure 3:
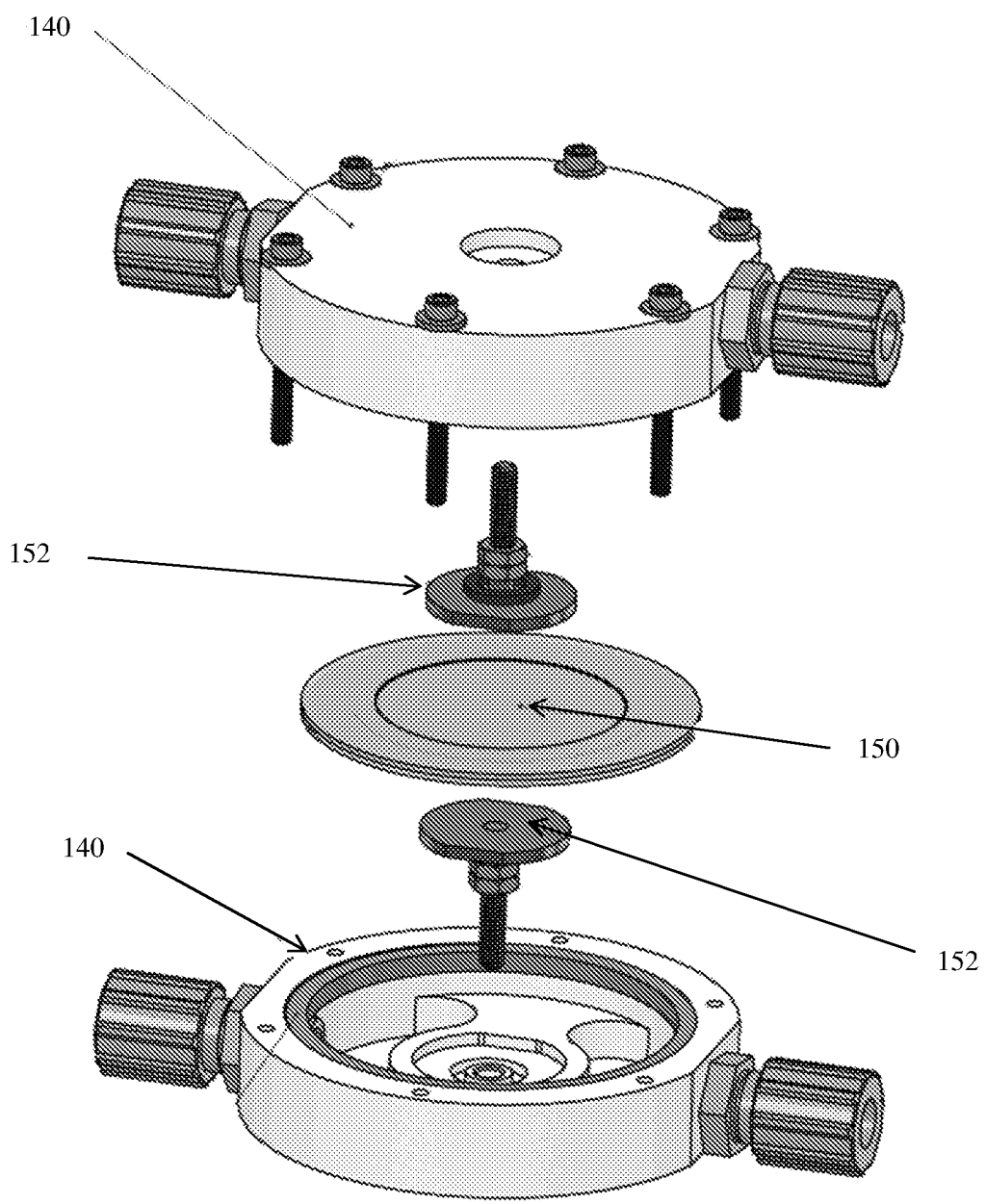
FIG. 3 is an exploded view of the lithium producing cell used in the lithium producing system of FIG. 1.

Also referring to FIG. 3, the lithium replenishment cell 140 is configured to receive an aqueous electrolyte. The cell body can be made of a suitably rigid material such as polypropylene. The lithium producing systems and processes described herein are not limited in this regard. Although FIGS. 1 and 2 illustrate the system 100 with one lithium replenishment cell 140, it is to be appreciated that other embodiments may utilize a plurality of lithium replenishment cells 140. In a scaled up production system this would allow multiple replenishment cells 140 to be operating in the loop with replenishment rate matched to the plating rate in the plating tank 110. If there is an issue with one of the replenishment cells 140, it could be taken offline without affecting the plating operation.

In the illustrated embodiment, the lithium replenishment cell 140 comprises a lithium ion conductive glass ceramic 150 that separates the organic electrolyte from the aqueous electrolyte, and an electrode 152 made from titanium or niobium coated with platinum, gold, or ruthenium. In certain non-limiting embodiments, the lithium ion conductive glass ceramic 150 is an ion conductive glass-ceramic having the following composition in mol percent: $P_2O_5$ 26-55%; $SiO_2$ 0-15%; $GeO_2+TiO_2$ 25-50%; in which $GeO_2$ 0-50%; $TiO_2$ 0-50%; $ZrO_2$ 0-10%; $M_2O_3$ 0-10%; $Al_2O_3$ 0-15%; $Ga_2O_3$ 0-15%; $Li_2O_3$-25% and containing a predominant crystalline phase comprising $Li_{1+x}(M, Al, Ga)_x(Ge_{1-y}Ti_y)_{2-x}(PO_4)_3$ where $X\leq0.8$ and $0\leq Y\leq1$ and where M is an element selected from the group consisting of Nd, Sm, Eu, Gd, Tb, Dy, Ho, Er, Tm and Yb, and/or $Li_{1+x+y}Q_xTi_{2-x}Si_3P_{3-y}O_{12}$ where $0<X\leq0.4$ and $0<Y\leq0.6$, and where Q is Al or Ga. Other examples include $11Al_2O_3$, $Na_2O\cdot 11Al_2O_3$, $(Na, Li)_{1+x}Ti_{2-x}Al_x(PO_4)_3$ $(0.6\leq x\leq0.9)$ and crystallographically related structures, $Na_3Zr_2Si_2PO_{12}$, $Li_3Zr_2Si_2PO_4$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_5Fe_2P_3O_{12}$ and $Li_4NbP_3O_{12}$ and combinations thereof, optionally sintered or melted. Suitable material with similarly high lithium metal ion conductivity and environmental/chemical resistance are manufactured by Ohara, Inc. (Kanagawa, JP) and others.

Suitable ceramic ion active metal ion conductors include, for example, LIC-GC™ from Ohara, LISICON (Lithium-ion Superionic Conductor) membrane material from Ampcera, and $Li_2O$—$Al_2O_3$—$SiO_2$—$P_2O_5$—$TiO_2$ (LATP). LISICON uses the lithium aluminum germanium phosphate $Li_{1.5}Al_{0.5}Ge_{1.5}P_3O_{12}$ or $Li_{1.5}Al_{0.5}Ge_{1.5}(PO_4)_3$ as the main crystalline phase. Small amount of dopants can be present. The lithium producing systems and processes described herein are not limited in this regard.

In certain non-limiting embodiments, the lithium ion conductive glass ceramic 150 measures approximately 7.6 cm or less in the longest dimension. Depending on the usage requirements or preferences for the particular system 100, lithium cells with Ohara LiC-GC™ plates measuring approximately 7.6 cm in the longest dimension can be retrofitted as the lithium replenishment cell 140. Plating does not occur in this replenishment cell 140, but in a separate plating tank 110 through which the organic electrolyte also circulates in the organic electrolyte loop. Stated slightly differently, the plating tank 110 is decoupled from the replenishment cell 140, as further explained below.

In certain non-limiting embodiments, both the aqueous and organic electrolytes are circulated in their own closed loops. In some embodiments, one or more pumps 142 and/or feed tanks 144 may be employed to produce or circulate a desired flow regime. When a potential is applied across the replenishment cell 140, lithium ions migrate from the aqueous electrolyte, through the lithium ion conductive glass ceramic 150, into the circulating organic electrolyte. In some embodiments, the cell 140 essentially works as a lithium ion pump moving lithium ions from the circulating aqueous electrolyte loop 160 into the circulating organic electrolyte loop 170.

According to certain non-limiting embodiments, the plating tank 110 is in the circulating organic electrolyte loop 170. In some embodiments, the anode 120 comprises a substantially planar mesh structure, e.g., a wire mesh measuring approximately 15.2 cm by approximately 12.7 cm. In other embodiments, however, the anode 120 may assume any other suitable geometric form. In some embodiments, the anode 120 can be made from titanium or niobium coated with platinum, gold, or ruthenium. In certain other non-limiting embodiments, the anode 120 can be made from any material that is compatible with the anolyte. In some embodiments, the plating tank 110 includes one or more sidewalls 180, and the anode 120 is coupled to one or more of the sidewalls 180. The anode 120 may be fixedly or removably attached to the sidewalls 180 of the plating tank 110. For example, the anode 120 may be formed integrally as one piece with the plating tank 110, or it may be separately formed and attached to the sidewalls 180. In another example, anode 120 and the sidewalls 180 may include mating threads to enable a screw-type connection 190. In other embodiments, the anode 120 may be attached to the sidewalls 180 via glue or friction. In other embodiments the anode 120 may be hung freely in the anolyte, not touching the plating tank sidewalls 180.

According to certain non-limiting embodiments, the substrate 130 to be plated with lithium is submerged in the plating tank 110 spaced apart from the anode 120. In some embodiments, the substrate 130 comprises a substantially planar body portion. In other embodiments, however, the substrate 130 may assume any other suitable geometric form. In some embodiments, the substrate 130 is coupled to one or more of the sidewalls 180. Like the anode 120, the substrate 130 may be fixedly or removably attached to the sidewalls 180 of the plating tank 110. For example, the substrate 130 may be formed integrally as one piece with the plating tank 110, or it may be separately formed and attached to the sidewalls 180. In another example, substrate 130 and the sidewalls 180 may include mating threads to enable a screw-type connection. In other embodiments, the substrate 130 may be attached to the sidewalls 180 via glue or friction. In other embodiments the substrate 130 may be hung freely in the anolyte, not touching the plating tank sidewalls 180, as long as space is maintained between the anode 120 and the substrate 130.

In some embodiments, a potential is applied to the substrate 130, and lithium plates onto the substrate 130 from the circulating organic electrolyte. A spent electrolyte stream is formed in the plating tank 110, and the spent electrolyte stream flows back through the lithium replenishment cell 140 for regeneration. In a non-limiting embodiment, the organic electrolyte is continuously fed or provided into the plating tank 110, lithium metal is continuously plated onto the substrate 130, and the spent electrolyte is continuously regenerated at one or more lithium replenishment cells 140.

The main benefits of the decoupled plating system 100 for producing lithium are that (1) the size of the substrate 130 to be plated is no longer limited to the size of the lithium ion conductive glass ceramic 150 (they are independent, allowing much larger substrates to be plated), (2) operating costs are reduced, (3) energy efficiency is improved in production of lithium, and (4) the replenishment cell 140 and the plating system 120/130 can be operated independently at different potentials to match lithium replenishment rates to lithium plating rates. In certain non-limiting embodiment, the substrate 130 to be plated can measure approximately 12.7 cm or greater in the longest dimension. In other embodiments, the size of the substrate and is only limited by the size of the plating tank and the capacity of the replenishment cells(s) 140 incorporated into the system.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A process for producing lithium, the process comprising:
   forwarding an organic electrolyte to a plating tank, wherein an anode and a substrate are provided within the plating tank;
   applying a potential to the substrate, thereby plating lithium onto the substrate from the organic electrolyte and forming a spent electrolyte stream; and
   regenerating the spent electrolyte stream within one or more lithium replenishment cells, wherein the one or more lithium replenishment cells receive an aqueous electrolyte and the organic electrolyte in separate streams.

2. The process for producing lithium of claim 1, wherein the anode comprises a substantially planar mesh structure.

3. The process for producing lithium of claim 1, wherein the substrate comprises a substantially planar body portion.

4. The process for producing lithium of claim 1, wherein the plating tank includes one or more sidewalls, and the anode and the substrate are coupled to the one or more sidewalls.

5. The process for producing lithium of claim 1, wherein the organic electrolyte comprises a DMC-LiPF$_6$ mix.

6. The process for producing lithium of claim 1, wherein the one or more lithium replenishment cells comprise a lithium ion conductive glass ceramic that separates the organic electrolyte from the aqueous electrolyte.

7. The process for producing lithium of claim 1, wherein the aqueous electrolyte comprises lithium carbonate dissolved in sulfuric acid.

8. The process for producing lithium of claim 6, wherein the lithium ion conductive glass ceramic is an ion conductive glass-ceramic having the following composition in mol percent: $P_2O_5$ 26-55%; $SiO_2$ 0-15%; $GeO_2+TiO_2$ 25-50%; in which $GeO_2$ 0-50%; $TiO_2$ 0-50%; $ZrO_2$ 0-10%; $M_2O_3$ 0-10%; $Al_2O_3$ 0-15%; $Ga_2O_3$ 0-15%; $Li_2O_3$-25% and containing a predominant crystalline phase comprising $Li_{1+x}$ (M, Al, Ga)$_x$ (Ge$_{1-y}$Ti$_y$)$_{2-x}$(PO$_4$)$_3$ where X≤0.8 and 0≤Y≤1 and where M is an element selected from the group consisting of Nd, Sm, Eu, Gd, Tb, Dy, Ho, Er, Tm and Yb, and/or $Li_{1+x+y}Q_xTi_{2-x}Si_3P_{3-y}O_{12}$ where 0<X≤0.4 and 0<Y≤0.6, and where Q is Al or Ga.

9. The process for producing lithium of claim 1, wherein the spent electrolyte stream is regenerated within a plurality of the lithium replenishment cells.

10. The process for producing lithium of claim 1, wherein the organic electrolyte is continuously provided to the plating tank, and the spent electrolyte is continuously regenerated at the one or more lithium replenishment cells.

11. The process for producing lithium of claim 1, wherein the one or more lithium replenishment cells and the plating tank are operated at different potentials to control a replenishment rate and a plating rate independently.

12. A process for producing lithium, the process comprising:
   introducing an organic electrolyte to a plating tank, wherein a substrate is provided within the plating tank;
   applying a potential to the substrate, thereby plating lithium onto the substrate from the organic electrolyte; and
   replenishing the organic electrolyte within one or more lithium replenishment cells that are configured to receive the organic electrolyte and an aqueous electrolyte, wherein the one or more lithium replenishment cells comprise a lithium ion conductive glass ceramic that separates the organic electrolyte from the aqueous electrolyte.

13. The process for producing lithium of claim 12, wherein the substrate comprises a substantially planar body portion.

14. The process for producing lithium of claim 12, wherein the plating tank includes one or more sidewalls, and the substrate is coupled to the one or more sidewalls.

15. The process for producing lithium of claim 12, wherein the organic electrolyte comprises a DMC-LiPF$_6$ mix.

16. The process for producing lithium of claim 12, wherein the aqueous electrolyte comprises lithium carbonate dissolved in sulfuric acid.

17. The process for producing lithium of claim 12, wherein the lithium ion conductive glass ceramic is an ion conductive glass-ceramic having the following composition in mol percent: $P_2O_5$ 26-55%; $SiO_2$ 0-15%; $GeO_2$+$TiO_2$ 25-50%; in which $GeO_2$ 0-50%; $TiO_2$ 0-50%; $ZrO_2$ 0-10%; $M_2O_3$ 0-10%; $Al_2O_3$ 0-15%; $Ga_2O_3$ 0-15%; $Li_2O_3$-25% and containing a predominant crystalline phase comprising $Li_{1+x}$ (M, Al, Ga)$_x$ (Ge$_{1-y}$Ti$_y$)$_{2-x}$(PO$_4$)$_3$ where X≤0.8 and 0≤Y≤1 and where M is an element selected from the group consisting of Nd, Sm, Eu, Gd, Tb, Dy, Ho, Er, Tm and Yb, and/or $Li_{1+x+y}Q_xTi_{2-x}Si_3P_{3-y}O_{12}$ where 0<X≤0.4 and 0<Y≤0.6, and where Q is Al or Ga.

18. The process for producing lithium of claim 12, wherein the organic electrolyte is continuously introduced to the plating tank, and the organic electrolyte is continuously replenished at the one or more lithium replenishment cells.

19. The process for producing lithium of claim 12, wherein the one or more lithium replenishment cells and the plating tank are operated at different potentials to control a replenishment rate and a plating rate independently.

20. A process for producing lithium, the process comprising:
   introducing an organic electrolyte to a plating tank;
   applying a potential to a substrate disposed within the plating tank, thereby plating lithium onto the substrate from the organic electrolyte and forming a spent electrolyte stream; and
   regenerating the spent electrolyte stream within a lithium replenishment cell, wherein the lithium replenishment cell comprises a lithium ion conductive glass ceramic that separates the organic electrolyte from an aqueous electrolyte.

21. The process for producing lithium of claim 20, wherein the organic electrolyte comprises a DMC-LiPF$_6$ mix and the aqueous electrolyte comprises lithium carbonate dissolved in sulfuric acid.

22. The process for producing lithium of claim 20, wherein the lithium ion conductive glass ceramic is an ion conductive glass-ceramic having the following composition in mol percent: $P_2O_5$ 26-55%; $SiO_2$ 0-15%; $GeO_2$+$TiO_2$ 25-50%; in which $GeO_2$ 0-50%; $TiO_2$ 0-50%; $ZrO_2$ 0-10%; $M_2O_3$ 0-10%; $Al_2O_3$ 0-15%; $Ga_2O_3$ 0-15%; $Li_2O_3$-25% and containing a predominant crystalline phase comprising $Li_{1+x}$ (M, Al, Ga)$_x$ (Ge$_{1-y}$Ti$_y$)$_{2-x}$(PO$_4$)$_3$ where X≤0.8 and 0≤Y≤1 and where M is an element selected from the group consisting of Nd, Sm, Eu, Gd, Tb, Dy, Ho, Er, Tm and Yb, and/or $Li_{1+x+y}Q_xTi_{2-x}Si_3P_{3-y}O_{12}$ where 0<X≤0.4 and 0<Y≤0.6, and where Q is Al or Ga.

23. The process for producing lithium of claim 20, wherein the organic electrolyte is continuously introduced to the plating tank, and regenerating the spent electrolyte stream comprises continuously replenishing the spent electrolyte stream with lithium ions at the lithium replenishment cell.

24. The process for producing lithium of claim 20, wherein the lithium replenishment cell and the plating tank are operated at different potentials to control a replenishment rate and a plating rate independently.

\* \* \* \* \*